United States Patent [19]

Tamura et al.

[11] 4,243,429
[45] Jan. 6, 1981

[54] PROCESS FOR PRODUCING TOBERMORITE AND ETTRINGITE

[75] Inventors: Hideo Tamura, Takarazuka; Seiro Ibuki, Kusatsu, both of Japan

[73] Assignee: Kubota Ltd., Osaka, Japan

[21] Appl. No.: 51,057

[22] Filed: Jun. 22, 1979

[30] Foreign Application Priority Data

Jun. 22, 1978 [JP] Japan ................................ 53-76143
Jun. 22, 1978 [JP] Japan ................................ 53-76145

[51] Int. Cl.³ .................... C09C 1/02; C01B 33/24; C01F 7/76
[52] U.S. Cl. ................................ 106/306; 106/18.12; 423/117; 423/123; 423/159; 423/331; 423/518
[58] Field of Search ............... 423/331, 518, 555, 122, 423/123, 127, 128, 158, 159, 164, 166, 117; 106/120, 306

[56] References Cited

U.S. PATENT DOCUMENTS

| | | | |
|---|---|---|---|
| 1,422,004 | 7/1922 | Sherwin | 423/331 X |
| 1,522,698 | 1/1925 | Parsons | 423/331 X |
| 1,971,354 | 8/1934 | Scheidt et al. | 423/331 X |
| 2,888,377 | 5/1959 | Allen | 423/331 X |
| 3,501,324 | 3/1970 | Kubo | 423/331 X |
| 3,642,437 | 2/1972 | Angstadt et al. | 423/127 |
| 3,992,220 | 11/1976 | Baudovin et al. | 106/306 |
| 4,002,484 | 1/1977 | Baudovin | 106/306 |

FOREIGN PATENT DOCUMENTS 50-36395  5/1975  Japan .................................. 423/518

*Primary Examiner*—Edward J. Meros
*Attorney, Agent, or Firm*—Armstrong, Nikaido, Marmelstein & Kubovcik

[57] ABSTRACT

A lime material and a siliceous material containing 10 to 40% by weight of alumina are admixed with an alkali solution, and the mixture is subjected to hydrothermal reaction with saturated water vapor at 4 to 40 kg/cm² to form tobermorite. The reaction mixture is filtered to separate the tobermorite therefrom. A lime material and a gypsum material are added to the resulting filtrate, and the mixture is reacted at room temperature to a temperature of 90° C. to form ettringite. The alkali filtrate separated from the ettringite is reused for the production of tobermorite.

7 Claims, 2 Drawing Figures

PROCESS FOR PRODUCING TOBERMORITE AND ETTRINGITE

TECHNICAL FIELD OF THE INVENTION

The present invention relates to a process for producing tobermorite useful for heat resistant nonflammable building materials and heat insulating materials, and also to a process for producing ettringite with the use of a by-product resulting from the process.

PRIOR ART

Tobermorite, $5CaO.6SiO_2.5H_2O$, is known as one of the calcium silicate hydrates. When a shaped body of cement and siliceous sand is subjected to hydrothermal reaction (140° to 200° C., 4 to 16 kg/cm², 8 to 12 hours) in an autoclave, tobermorite is usually formed. The resulting platelike crystals are thought to give enhanced strength to the hardened cement body. Tobermorite can also be prepared from a slurry of milk of quick lime and finely divided siliceous sand containing silicic acid of high purity by autoclaving (170° C., 8 kg/cm², 4 to 8 hours). The product affords lightweight shaped bodies resistant to high temperatures of up to 850° C. and having a bulk density of up to 0.2. With such outstanding heat insulating properties and low specific gravity, tobermorite is useful as an ideal component of lightweight nonflammable heat resistant building materials and heat insulating materials.

Tobermorite has heretofore been commercially produced from lime and diatomaceous earth or a special siliceous material by hydrothermal treatment with an autoclave. However, since diatomaceous earth and like siliceous material usually contain a small amount of $Al_2O_3$, $Al_2O_3$ combines with $SiO_2$ to give hydrogarnet, $Ca_3Al_2(Si_{n-x}.xH_4)O_{12}$ wherein $n=3$ and $x=1$ to 3, when the starting materials are autoclaved for hydrothermal reaction, with the result that the tobermorite obtained has reduced strength due to the presence of hydrogarnet. The synthesis of tobermorite therefore requires the use of a siliceous material almost free from alumina but containing $SiO_2$ with a high purity of 90 to 95%. Such high-purity siliceous materials are available only with difficulty because of limited sources and are costly.

Ettringite is a double salt of calcium aluminate and sulfate ($3CaO.Al_2O_3.3CaSO_4.32H_2O$) and is characterized by a large amount of crystal water contained in its molecular structure which accounts for about 47% of the molecular weight thereof. It starts to release the crystal water at a temperature of about 60° C. or higher and becomes completely dehydrated at 150° C. Accordingly wall materials incorporating ettringite are useful as building materials which per se act to extinguish fire especially effectively at the initial stage of fire accidents. Ettringite, which is in the form of needlelike crystals, can also be made into nonflammable paper as admixed with pulp. Despite such usefulness, the synthesis of this material has rarely been attempted. Only a few proposals heretofore made include a process for preparing ettringite by admixing an alkali solution with a mixture of granulated blast furnace slag and gypsum and reacting the resulting mixture at room temperature or elevated temperature (Published Unexamined Japanese Patent Application Sho 53-32900).

DISCLOSURE OF THE INVENTION

An object of the present invention is to provide a process for producing tobermorite from a lime material, alkali solution and usual siliceous material, such as kaolin, containing a large amount of alumina.

Another object of the invention is to provide a process for producing ettringite by utilizing a filtrate containing an alkali reaction mixture resulting from the production of tobermorite as a byproduct, by reacting a gypsum material and lime material with the filtrate.

Still another object of the invention is to provide a closed synthetic cycle in which an alkali solution resulting from the production of ettringite is reused for the production of tobermorite, the alkali solution thus being circulated through the chemical reaction cycle without being discharged from the system.

According to the process of this invention, tobermorite is synthesized from a mixture of a siliceous material containing 10 to 40% by weight of alumina ($Al_2O_3$) and a lime material in such proportions that the $SiO_2/CaO$ mole ratio is 0.7 to 1.2. An alkali solution of sodium hydroxide, potassium hydroxide or the like is admixed with the mixture to prepare a suspension. The suspension is subjected to hydrothermal reaction with use of water vapor at pressure of 4 to 40 kg/cm² to give tobermorite.

Examples of useful siliceous materials are kaolin, terra alba, mica, volcanic ash, granulated blast furnace slag, fly ash, etc.

Examples of useful lime materials are quick lime, slaked lime and carbide residuum.

EXPERIMENT 1

A 21.85 g quantity of kaolin as a siliceous material and 10.53 g of $Ca(OH)_2$ as a lime material, each in the form of finely divided particles, were reacted in an autoclave under the following conditions, with $Ca(OH)_2$ calculated as CaO. $CaO/SiO_2$ mole ratio=0.83, weight (500 g) of water/weight of $CaO+SiO_2+Al_2O_3=19.4$, hydrothermal reaction time=3 hours, NaOH concentration=150 g/liter, stirring speed=300 r.p.m., and saturated water vapor pressure varying over the range of 1 to 14 kg/cm².

The reaction mixture was filtered, and the Al component of the filtrate was determined to calculate the Al extraction ratio, which is given by:

$$\frac{\text{Weight of Al in filtrate, calcd as } Al_2O_3(g)}{\text{Weight of } Al_2O_3 \text{ in kaolin}(g)} \times 100(\%)$$

| Specimen No. | Pressure (kg/cm²) | Vapor temp. (°C.) | Al extraction ratio (%) |
|---|---|---|---|
| 1 | 14 | 200 | 54.0 |
| 2 | 10 | 190 | 54.5 |
| 3 | 8 | 182 | 54.7 |
| 4 | 6 | 170 | 56.0 |
| 5 | 4 | 158 | 54.9 |
| 6 | 3 | 148 | 47.1 |
| 7 | 2 | 135 | 41.4 |
| 8 | 1 | 125 | 310 |

Figure 2:
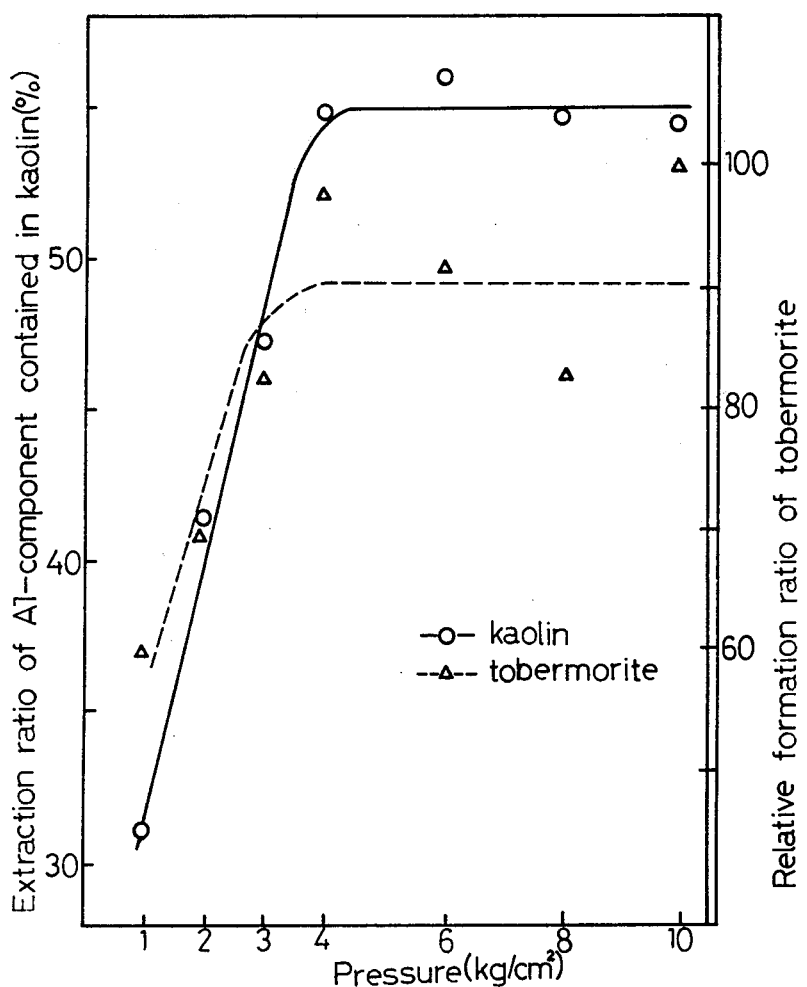
FIG. 2 is a graph showing tobermorite formation ratio and alumina extraction ratio relative to the water vapor pressure of a hydrothermal reaction system.

FIG. 2 shows the results of the experiment. In this graph, the pressure is plotted as abscissa vs. the tobermorite formation ratio and Al extraction ratio as ordinate. An approximately constant tobermorite formation ratio is achieved at about 3 kg/cm² or higher, while the Al extraction ratio levels off at 4 kg/cm² and remains substantially constant at higher pressures. Pressures exceeding 40 kg/cm² pose problems in the strength of the equipment and are uneconomical. Thus the vapor pressure is preferably in the range of 4 to 40 kg/cm².

Kaolin has the following composition as determined by quantitative analysis.

| | |
|---|---|
| $SiO_2$ | 46.4% by weight |
| $Al_2O_3$ | 37.4 |
| $Fe_2O_3$ | 0.5 |
| Miscellaneous | 2.9 |
| Ig. loss | 12.8 |

An X-ray analysis of the solid product revealed a diffraction diagram having a peak at $2\theta = 29.0°$, whereby the product was identified as tobermorite, and the amount of tobermorite was also calculated.

With the process of this invention, a major portion of the alumina contained in an excessive amount in the siliceous material migrates into the liquid phase, giving an alkali reaction product such as sodium aluminate without forming hydrogarnet which is produced by the conventional hydrothermal reaction. The present process therefore affords tobermorite of good quality. Differential thermal analysis shows that whereas usual tobermorite has a peak at 850° C. and is subject to degradation, the tobermorite prepared from kaolin has a peak at 900° C. and higher thermal decomposition temperature, presumably because Si has been substituted for Al remaining in the solid phase, in the same form.

The reaction mixture resulting from the above process is filtered to obtain a filtrate as separated from tobermorite. (The filtrate is a sodium aluminate solution when sodium hydroxide is used for the alkali solution in the process.) A lime material and gypsum material are added to the filtrate, each in an amount of about 3 moles per 2 moles of the alkali product, such as sodium aluminate, in the filtrate. The mixture is then reacted at room temperature to 90° C. for at least 5 hours, whereby ettringite can be formed.

Examples of useful gypsum materials are calcined gypsum, hemihydrate gypsum, gypsum dihydrate, gypsum produced by the desulfurization of exhaust gases, etc.

EXPERIMENT 2

A 43.70 g quantity of kaolin and 21.06 g of $Ca(OH)_2$, each in the form of finely divided particles, were admixed with 20 g/liter aqueous solution of sodium hydroxide to prepare a suspension, which was subjected to hydrothermal reaction in an autoclave at a temperature of 194° C. for 5 hours with use of saturated water vapor at pressure of 14 kg/cm² while the suspension was being stirred at 300 r.p.m. The solid reaction product was filtered off and analyzed by X-ray diffractiometry, which revealed that the product consisted essentially of tobermorite.

To the filtrate separated from the solid product were added 7.24 g of calcium hydroxide and 16.70 g of gypsum dihydrate. The mixture was stirred in a thermostat at 25° C. for 30 minutes and then allowed to stand. Every time the mixture had been left standing for 3 hours, 5 hours and 20 hours, the solid reaction product was collected and subjected to X-ray diffractiometry to identify the components of the product and the amounts thereof with the following results.

| Specimen No. | Standing time | Solid phase component |
|---|---|---|
| 9 | 3 Hours | Ettringite, a large amount of gypsum and a very small amount of calcium carbonate. |
| 10 | 5 Hours | A large amount of ettringite, and very small amounts of gypsum and calcium carbonate. |
| 11 | 20 Hours | A large amount of ettringite, no gypsum and a very small amount of calcium carbonate. |

The reaction temperature for the formation of ettringite is preferably up to 90° C. Temperatures above 90° C. will not permit smooth formation of combined water, inhibiting the formation of ettringite. The ettringite forming reaction is conducted for 2 to 10 hours, preferably for at least 5 hours. The filtrate separated from ettringite consists predominantly of an alkali such as sodium hydroxide and is reusable as such for the production of tobermorite in the first stage.

Figure 1:
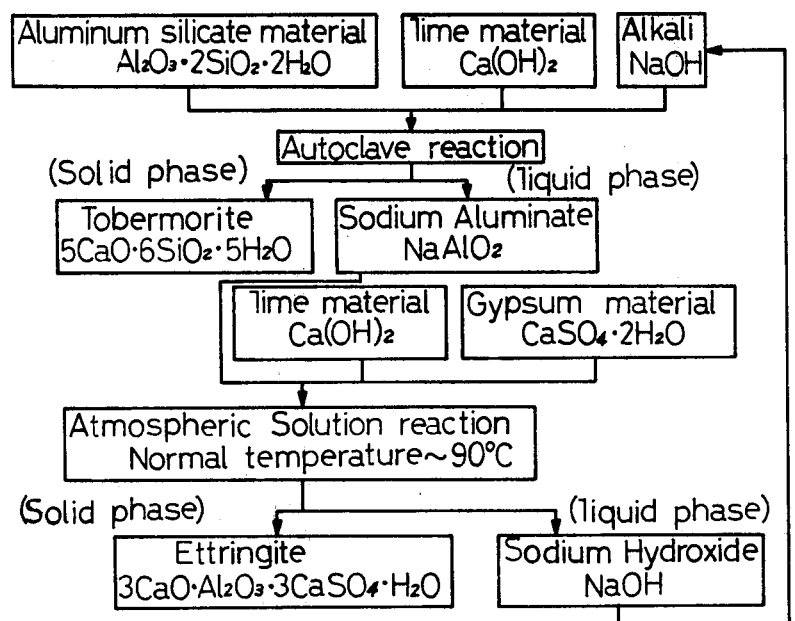
FIG. 1 is a block diagram showing the process of this invention.

As will be apparent from the block diagram of FIG. 1, the alkali solution is repeatedly reused in this invention by being circulated through the system without being discharged therefrom, so that the chemical reaction can be carried out only with the replenishment of the system with a quantity of alkali solution to compensate for the spontaneous consumption. Thus the process affords tobermorite and ettringite at low costs without causing any environmental pollution with the alkali.

The second step of forming ettringite may be initiated with the use of the reaction mixture resulting from the tobermorite forming step and having both the solid phase and liquid phase without separating off the solid phase. The second step will then give a solid mixture of tobermorite and ettringite. This mixture has higher strength than tobermorite.

What is claimed is:

1. A process for producing ettringite by adding an alkali solution to siliceous material and gypsum material and reacting the mixture at room temperature or hydrothermally, characterized by the steps of:
   admixing an alumina-containing siliceous material and a lime material with an alkali solution,
   subjecting the resulting mixture to hydrothermal reaction with water vapor at a pressure of 4 to 40 kg/cm² to form tobermorite,
   filtering off the tobermorite from the reaction mixture, and
   admixing a lime material and a gypsum material with the resulting alkali reaction product in the filtrate and reacting the mixture at room temperature to a temperature of up to 90° C. to form ettringite.

2. A process as defined in claim 4 wherein the siliceous material is selected from the group consisting of kaolin, fly ash, terra alba, mica, volcanic ash and granulated blast furnace slag, or a mixture of at least two of said materials.

3. A process as defined in claim 1 wherein the alkali solution has the concentration of 10 to 200 g of sodium hydroxide in 1 liter of water.

4. A process as defined in claim 1 wherein the lime material is selected from the group consisting of quick lime, slaked lime and carbide residuum, or a mixture of at least two of said materials.

5. A process as defined in claim 1 wherein the gypsum material is selected from the group consisting of calcined gypsum, hemihydrate gypsum, gypsum dihydrate and gypsum produced by the desulfurization of exhaust gases, or a mixture of at least two of said gypsum materials.

6. A process for producing ettringite by adding an alkali solution to siliceous material and gypsum material and reacting the mixture at room temperature or hydrothermally, characterized by the sequential steps of:

admixing an alumina-containing siliceous material and a lime material with an alkali solution, subjecting the resulting mixture to hydrothermal reaction with water vapor at a pressure of 4 to 40 kg/cm$^2$ to form tobermorite, filtering off the tobermorite from the reaction mixture, and admixing a lime material and a gypsum material with the resulting alkali reaction product in the filtrate and reacting the mixture at room temperature to a temperature of up to 90° C. to form ettringite, the process further being characterized by thereafter repeating said sequential steps with addition of the alumina-containing siliceous material and the lime material to a filtrate resulting from said fourth-mentioned step and separated from the ettringite.

7. A process for producing ettringite by adding an alkali solution to siliceous material and gypsum material and reacting the mixture at room temperature or hydrothermally, characterized by the steps of:

admixing an alumina-containing siliceous material and a lime material with an alkali solution, subjecting the resulting mixture to hydrothermal reaction with water vapor at a pressure of 4 to 40 kg/cm$^2$ to form tobermorite, and admixing a lime material and a gypsum material with the resulting alkali reaction product in the reaction mixture containing the tobermorite and reacting the mixture at room temperature to a temperature of up to 90° C. to form ettringite.

* * * * *